(12) United States Patent
Alldredge

(10) Patent No.: US 10,694,679 B2
(45) Date of Patent: Jun. 30, 2020

(54) BALE SPACER DEVICE, BALE VENTILATION SYSTEM, AND METHODS OF USE

(71) Applicant: Rodney H. Alldredge, Peachtree Corners, GA (US)

(72) Inventor: Rodney H. Alldredge, Peachtree Corners, GA (US)

(*) Notice: Subject to any disclaimer, the term of this patent is extended or adjusted under 35 U.S.C. 154(b) by 263 days.

(21) Appl. No.: 15/090,763

(22) Filed: Apr. 5, 2016

(65) Prior Publication Data

US 2016/0286729 A1    Oct. 6, 2016

Related U.S. Application Data

(60) Provisional application No. 62/143,247, filed on Apr. 6, 2015.

(51) Int. Cl.
    *A01F 25/08*      (2006.01)
    *A01F 25/13*      (2006.01)

(52) U.S. Cl.
    CPC .............. *A01F 25/08* (2013.01); *A01F 25/13* (2013.01)

(58) Field of Classification Search
    CPC .......... B60J 11/00; A01F 25/13; A01F 25/08; E04H 15/36
    USPC ................. 296/136; 135/88, 132, 133; 52/4; 454/179, 182, 174
See application file for complete search history.

(56) References Cited

U.S. PATENT DOCUMENTS

| | | | | |
|---|---|---|---|---|
| 1,549,138 A | * | 8/1925 | Maudlin | A01F 25/08 454/179 |
| 1,788,985 A | * | 1/1931 | Connolly | A01F 25/10 454/174 |
| 2,436,337 A | * | 2/1948 | Smith | B66C 19/02 104/126 |
| 2,502,205 A | * | 3/1950 | Collins | A01F 25/08 100/98 A |
| 2,635,562 A | * | 4/1953 | Abramson | A01F 25/10 414/132 |
| 2,876,715 A | * | 3/1959 | Banks | B65D 90/06 52/3 |
| 4,197,673 A | * | 4/1980 | Thomas | A01G 13/02 47/23.2 |
| 4,483,127 A | * | 11/1984 | Forkner | A01F 25/13 100/100 |
| 4,684,165 A | * | 8/1987 | Becker | B60J 11/00 135/88.07 |
| 4,716,919 A | * | 1/1988 | Griffin | E04H 15/001 135/133 |
| 4,907,380 A | * | 3/1990 | Jannin | A01F 15/071 150/154 |

(Continued)

*Primary Examiner* — Steven B McAllister
*Assistant Examiner* — Allen R Schult
(74) *Attorney, Agent, or Firm* — Mathew L. Grell; Jeffrey C. Watson; Grell & Watson Patent Attorneys LLC

(57) ABSTRACT

A hay bale spacer, the hay bale spacer configured with a riser support to provide an air gap between a tarp and an outer surface of a bale of hay, wherein said riser support is configured to be gripped, a side integral to said riser support, said side comprises a plurality of stakes extending from said side, said stakes configured to releasably affix thereto the outer surface of the bale of hay and that functions to create an environment with proper air circulation, prevent condensation, and to prevent mold growth within the hay bale, thus extending the storage expectancy of the bale.

10 Claims, 11 Drawing Sheets

(56) References Cited

U.S. PATENT DOCUMENTS

| | | | | | |
|---|---|---|---|---|---|
| 5,197,236 | A | * | 3/1993 | Calhoun | A01F 25/13 52/3 |
| 5,197,503 | A | * | 3/1993 | Chen | B60J 11/00 135/151 |
| 5,518,289 | A | * | 5/1996 | Cobble | B60J 11/00 135/93 |
| 5,669,183 | A | * | 9/1997 | Frentress | A01F 25/13 206/83.5 |
| 5,678,358 | A | * | 10/1997 | Koledin | E04H 9/12 135/115 |
| 6,006,469 | A | * | 12/1999 | DeMatties | A01G 13/02 47/23.2 |
| 7,117,879 | B1 | * | 10/2006 | Massey | E04H 15/38 135/132 |
| 9,441,394 | B1 | * | 9/2016 | Hotes | E04H 15/54 |
| 2014/0007451 | A1 | * | 1/2014 | Brown, Jr. | A01F 25/00 34/265 |

* cited by examiner

BALE SPACER DEVICE, BALE VENTILATION SYSTEM, AND METHODS OF USE

CROSS-REFERENCE TO RELATED APPLICATIONS

To the full extent permitted by law, the present United States Non-Provisional patent application hereby claims priority to and the full benefit of U.S. Provisional Patent Application entitled "The Bale-Saver Hay Bale Ventilation System" filed on Apr. 6, 2015, having assigned Ser. No. 62/143,247, which is incorporated by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field

The instant disclosure relates to a hay bale spacer device, bale ventilation system, and methods of use thereof. More particularly, the instant disclosure relates to a spiked bale spacer device for sticking to an exterior surface of a bale of hay, specifically to large round bales of hay.

Description of the Related Art

Hay has been used extensively to provide feed in beef, dairy, sheep, and horse livestock systems when grazing is not available. Historically, haymaking meant cutting abundant forage with a scythe and stacking it in small stacks. The hay remained in stacks and animals ate from the edges. However, much about haymaking has changed with new technology over the years, such as sickle bar and disc or rotary mowers to cut the forage, hay rakes to gather and roll the partially dry forage into a windrow, allowing the underside of the forage to dry, balers to pick up the crop in the field and compress it into a bale. Sizes of bales can vary depending on the machine. Small rectangular bales weigh approximately 38 to 40 pounds and are manually hoisted from field to a wagon and typically transported to an open air barn for storage and protection from rain. Large square bales weigh approximately 1200 pounds (3×4×8 feet) and are machine hoisted and moved from the field to an open air storage placement, stacked or unstacked. Round bales can vary from 500 to 2,000 pounds and are machine hoisted and moved from the field to an open air storage placement, stacked or unstacked. More recently, both rectangular, square, and round bales BH are often stored outside where they are exposed to the elements resulting in hay deterioration due to moisture. In an effort to combat this deterioration, round hay bales are currently wrapped, encased, tarped, or covered with plastic or woven material and stacked to shield the hay from precipitation, such as rain. Rectangular bales are typically stacked and wrapped or covered with plastic or woven material to shield the hay from precipitation. One disadvantage of this approach is that such tarps or other rain resistant materials create an environment with poor air circulation and promote mold growth within the hay bale, thus shortening the storage expectancy of the bale. Another disadvantage of this approach is that such tarps create a belief that adequate hay is available to feed livestock and it is not until after the wrap is removed that the farmer knows whether the hay is useable, possibly causing a shortage of animal feed. Another disadvantage of this approach is that such tarps lead to condensation under the tarp and moisture damage to the hay.

Therefore, it is readily apparent there is a recognizable unmet need for hay bale spacer device, bale ventilation system, and methods of use thereof that functions to provide a bale spacer to provide an air flow zone between the hay bale and tarp whether for a single bale, stacked bales, or rowed bales that functions to create an environment with proper air circulation, prevent condensation, and to prevent mold growth within the hay bale, thus extending the storage expectancy of the bale.

SUMMARY

Briefly described, in an exemplary embodiment, the present apparatus, system, and method overcomes the above-mentioned disadvantages and meets the recognized need for such a hay bale spacer device, bale ventilation system, and methods of use thereof by providing, in general, a hay bale spacer, the hay bale spacer configured with a riser support to provide or maintain an air gap between a tarp and an outer surface of a bale of hay, wherein said riser support is configured to be gripped, a side integral to said riser support, said side comprises a plurality of stakes extending from said side, said stakes configured to releasable affix thereto the outer surface of the bale of hay and that functions to create an environment with proper air circulation, prevent condensation, and to prevent mold growth within the hay bale, thus extending the storage expectancy of the bale.

The present hay bale spacer device may be a hand held device for staking therein an outer surface of a bale of hay to create a spacer between a precipitation protective tarp and the outer surface of a bale of hay to enable ample air gap and flow between outer surface of a bale of hay and the precipitation protective tarp, and thus, to prevent condensation from forming under the tarp.

In select embodiments, the riser support may be configured to be hand gripped to enable a striking motion to set the plurality of stakes into the outer surface of the bale of hay to a depth up to where the stakes meets the edge.

Accordingly, a feature of the hay bale spacer device, bale ventilation system, and methods of use thereof is its ability to maneuvered and operated by hand for easy and quick installation as well as removed or repositioned to provide maximum space between outer surface of a bale of hay and the precipitation protective tarp.

In select embodiments, the riser support may be configured to include a front end and a rear end formed integral to the riser support to form an elongated shaped hay bale spacer to provide an elongated spacer or series of spacers or series of end-to-end spacers mountable or releasably affixable in the outer surface of the bale of hay.

Accordingly, a feature of the hay bale spacer device, bale ventilation system, and methods of use thereof is its ability to provide an elongated spacer to provide maximum space the length of the bale between outer surface of a bale of hay and the precipitation protective tarp.

In select embodiments, the hay bale spacer device may be configured to include a side wall formed integral with the riser support and/or the front end and a rear end to support the edge and plurality of stakes.

Accordingly, a feature of the hay bale spacer device, bale ventilation system, and methods of use thereof is its ability to provide side wall formed integral with the riser support and/or front end and a rear end to support the edge and plurality of stakes to provide support for the plurality of stakes to removeably affix the plurality of stakes therein the outer surface to maintain adequate air gap the length of the bale of hay, between outer surface of the bale of hay and a tarp.

In an exemplary embodiment of the hay bale spacer device, in general includes an apparatus for maintaining an air gap between an outer surface of a bale of hay and a tarp comprising a hay bale spacer, the hay bale spacer configured with a riser support to provide the air gap, wherein the riser support is configured to be gripped, a side integral to the riser support, the side comprises a plurality of stakes extending from the side, the stakes configured to releasable affix thereto the outer surface of the bale of hay.

In a further exemplary embodiment the bale ventilation system, in general a system for maintaining an air gap for ventilation, the system comprising a plurality of bales of hay, the plurality of bales of hay having an outer surface, a tarp to cover the plurality of bales of hay;
a plurality of hay bale spacers, each of the plurality of bales of hay spacers configured with a riser support to provide an air gap between the an outer surface and the tarp, wherein the riser support is configured to be gripped, a side integral to the riser support, the side comprises a plurality of stakes extending from the side, the plurality of stakes configured to releasable affix thereto the outer surface of the plurality of bales of hay.

In still a further exemplary embodiment of the method of maintaining an air gap between an outer surface of a plurality of bales of hay and a tarp to prevent condensation from forming, including the steps of providing a plurality of hay bale spacers, each of the plurality of hay bale spacers configured with a riser support to provide an air gap between the an outer surface and the tarp, wherein the riser support is configured to be gripped, a side integral to the riser support, the side comprises a plurality of stakes extending from the side, the plurality of stakes configured to releasable affix thereto the outer surface of the plurality of bales of hay, affixing the plurality of hay bale spacers to the outer surface of the plurality of bales of hay, covering the plurality of bales of hay and the plurality of hay bale spacers with a tarp, positioning the plurality of hay bale spacers to the outer surface of the plurality of bales of hay to maximize air circulation under the tarp.

Accordingly, a feature of the hay bale spacer device, bale ventilation system, and methods of use thereof is its ability to provide an air gap or space therebetween the hay bales exterior surface and a tarp or like cover, to provide ventilation or air flow between outer surface of the hay bale and the tarp or cover to maintain dry storage conditions.

Another feature of the hay bale spacer device, bale ventilation system, and methods of use thereof is its ability to enable air flow over the bales to prevent condensation and moisture damage to the bales of hay.

Still another feature of the hay bale spacer device, bale ventilation system, and methods of use thereof is its ability to provide an inexpensive way to raise the tarp off the bale of hay (create or maintain an air gap) and encourage air flow between the tarp and the outer surface of the bale of hay.

Yet another feature of the hay bale spacer device, bale ventilation system, and methods of use thereof is its ability to be easily releasably affixed thereto the outer surface of the bale of hay and be easily removed and moved to a new location to maximize air flow between the tarp and the outer surface of the bale of hay.

Yet another feature of the hay bale spacer device, bale ventilation system, and methods of use thereof is its ability to stack, one on top of the other, unused hay bale spacer devices to minimize storage and transport of the hay bale spacer device.

These and other features of the hay bale spacer device, bale ventilation system, and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present hay bale spacer device, bale ventilation system, and methods of use thereof will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-11, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 9:
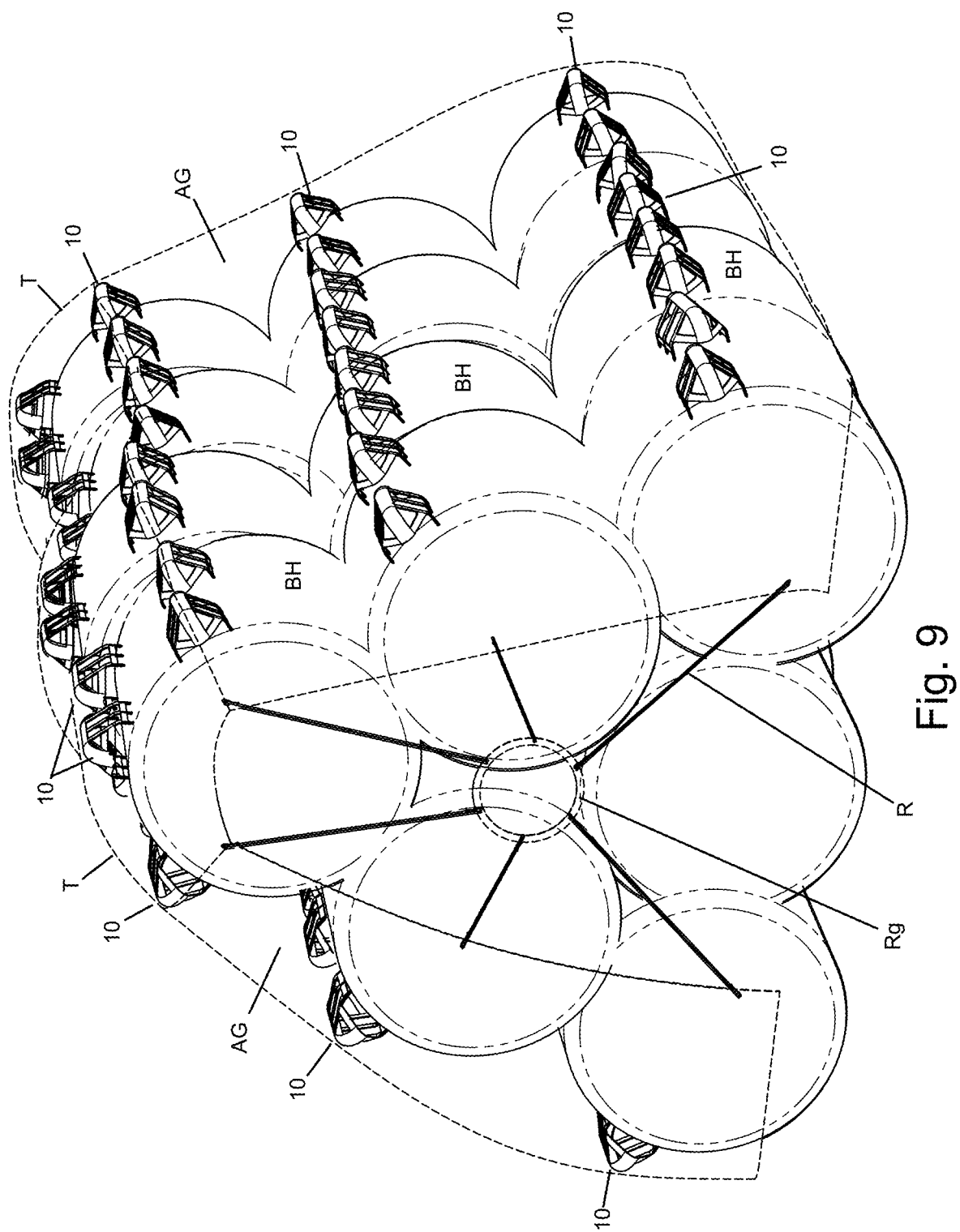
FIG. 9 is a use view of the hay bale spacer device, round hay bale ventilation system, and methods of use thereof of FIGS. 1-8, shown in use with a stack of bales of hay.
Figure 10:
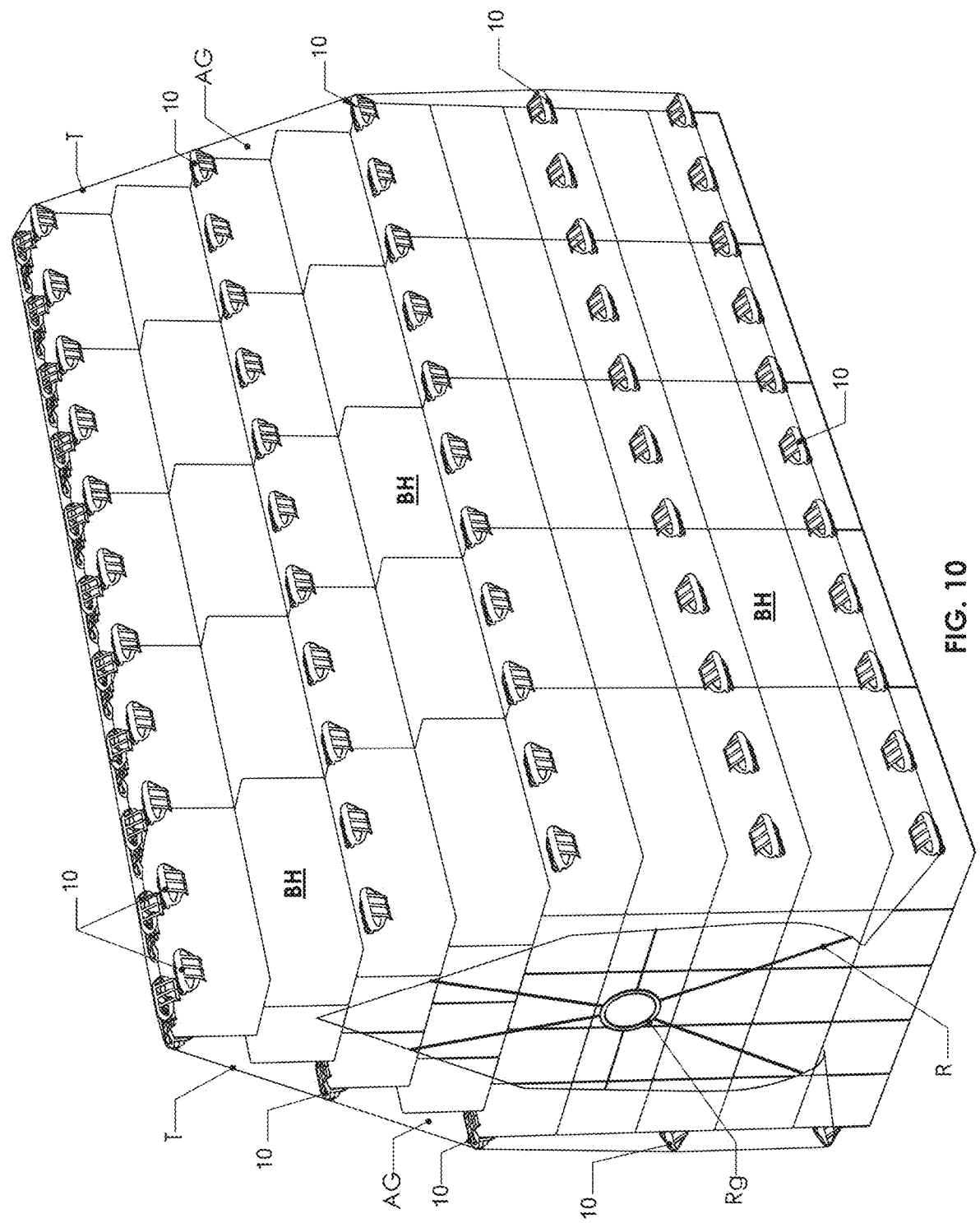
FIG. 10 is a use view of the hay bale spacer device, rectangle hay bale ventilation system, and methods of use thereof of FIGS. 1-8, shown in use with a stack of bales of hay.

Referring now to FIGS. 1-6 by way of example, and not limitation, therein is illustrated an example embodiment apparatus, such as hay bale spacer 10, wherein hay bale spacer 10 may include riser support 20 having edge 40 and/or side 23 wherein a plurality of splines, such as stakes 30 extend therefrom edge 40 and/or a side or a surface, such as first side 23. Preferably, plurality of stakes 30 may be utilized to stab, penetrate or latch hay bale spacer 10 thereto bale of hay BH, as shown in FIG. 9-10.

Moreover, riser support 20 may include first front end and second front end 22 preferably formed integral thereto riser support 20 and edge 40 and/or first side 23. It is contemplated herein that first front end 21 and second front end 22 may provide elevation or vertical height thereto riser support 20 and edge 40 and/or first side 23 and may be configured as straight, elongated, curved, angled or any other configuration or shape capable of connecting riser support 20 thereto edge 40 and/or first side 23. It is further contemplated herein that first front end 21 and second front end 22 may be configured or shaped similar to a bull nose shape having an indent 26, 26.1, 26.2. It is still further contemplated herein that first front end 21 and second front end 22 on either end of hay bale spacer 10 may be configured so it can be positioned to hang over the end of bale of hay BH, and functions to enable airflow and to create a spacer or air gap AG between outer surface OS of bale of hay BH and tarp T.

Furthermore, hay bale spacer 10 may include one or more surfaces or sides, such as first side 23, second side 24, and third side 25 preferably formed integral thereto or interconnects to riser support 20 and edge 40. It is contemplated herein that first side 23 may provide a side or surface to affix or position plurality of stakes 30. Moreover, first side 23 may include left side 23.1 and right side 23.2, wherein a first set of plurality of stakes 30 may include stakes 30.1, 30.2, 30.3 (first plurality of stakes) affixed and/or integral thereto left side 23.1 and second set of plurality of stakes 30 may include stakes 30.4, 30.5, 30.6 (second plurality of stakes) affixed and/or integral thereto right side 23.2.

Preferably, third side 25 may be positioned therebetween riser support 20 and edge 40 or first side 23. Preferably, third side 25 may provide elevation or height therebetween riser support 20 and edge 40 and may be configured as straight, curved, angled or any other configuration or shape capable of connecting riser support thereto edge 40. It is contemplated herein that third side 25 may be a continuous surface, formed of strips, or the like to provide one or more cut outs, holes or apertures 50 therein third side 25 of hay bale spacer 10. Moreover, for example a left side of third side 25 may include one or more sections, such as strips 25.1, 25.2, and 25.3 spaced thereapart to form apertures 50.1 and 50.2. Furthermore, apertures 50.1 and 50.2 may be utilized to enable a user to firmly grip riser support 20 and or to enable air flow through apertures 50.1 and 50.2 or less resistance to airflow therein. Furthermore, for example a right side of third side 25 may include one or more sections, such as strips 25.4, 25.5, and 25.6 spaced thereapart to form apertures 50.3 and 50.4. Furthermore, apertures 50.3 and 50.4 may be utilized to enable a user to firmly grip riser support 20. It is recognized herein that apertures 50 may provide air flow passageways or less resistance to airflow therethrough hay bale spacer 10.

Preferably, second side 24 may be positioned therebetween either of first front end 21 and second front end 22, and third side 25 and be formed integral thereto riser support 20 and edge 40. It is contemplated herein that second side 24 may provide a side or surface to affix or position plurality of stakes 30. Moreover, second side 24 may include first front side 24.2 and second front side 24.4. Furthermore, for example second side 24 may include one or more sections, such as strips 24.2, and 24.4 to form apertures 50.7 and 50.8. Furthermore, apertures 50.7 and 50.8 may be utilized to enable a user to firmly grip riser support 20 and assist removal of first front end 21 therefrom bale of hay BH. Furthermore, second side 24 may include first back side 24.1 and second back side 24.3. Furthermore, for example second side 24 may include one or more sections, such as strips 24.2, and 24.4 to form apertures 50.5 and 50.6. Furthermore, apertures 50.5 and 50.6 may be utilized to enable a user to firmly grip riser support 20 and assist removal of second front end 22 therefrom bale of hay BH.

Hay bale spacer 10 is preferably constructed of plastic, as plastic offers a variety of forms and shapes; however, other suitable materials such as wood, metal, aluminum, composites or the like, can be utilized, provided such material has sufficient strength and/or durability as would meet the purpose described herein.

Hay bale spacer 10 may be configured having a length of approximately the length to run the axial or long side of bale of hay BH whether bale of hay BH is a round, square or rectangular bale or other bale configuration; more preferably hay bale spacer 10 may have a length of approximately much shorter than the length to run the axial or long side of bale of hay BH so as to utilize multiple spaced hay bale spacers 10 positioned linearly the length to run the axial or long side of bale of hay BH.

Still furthermore hay bale spacer 10 may be configured as a layer of material (shown in FIGS. 1-6), which may be molded or formed, or as a solid or a combination thereof.

Referring again to FIGS. 1-6 hay bale spacer 10 may refer to a device that may be held in the hand and thrust into bale of hay BH and may have any desire dimensions, including, but not limited to, approximately 8.77 inches in height from edge 40 to the top of riser support 20 by 24.20 inches in length from first front end 21 to second front end 22 by 12.20 inches wide as inside distance between hay bale spacer 10. As an example, and clearly not limited thereto, the purpose of hay bale spacer 10 may be to grip by hand and thrust hay bale spacer 10 into bale of hay BH to create a spacer or air gap AG between outer surface OS of bale of hay BH and tarp T, and that functions to create an environment with proper air circulation, prevent condensation, and to prevent mold growth within the hay bale, thus extending the storage expectancy of the bale.

It

Figure 1:
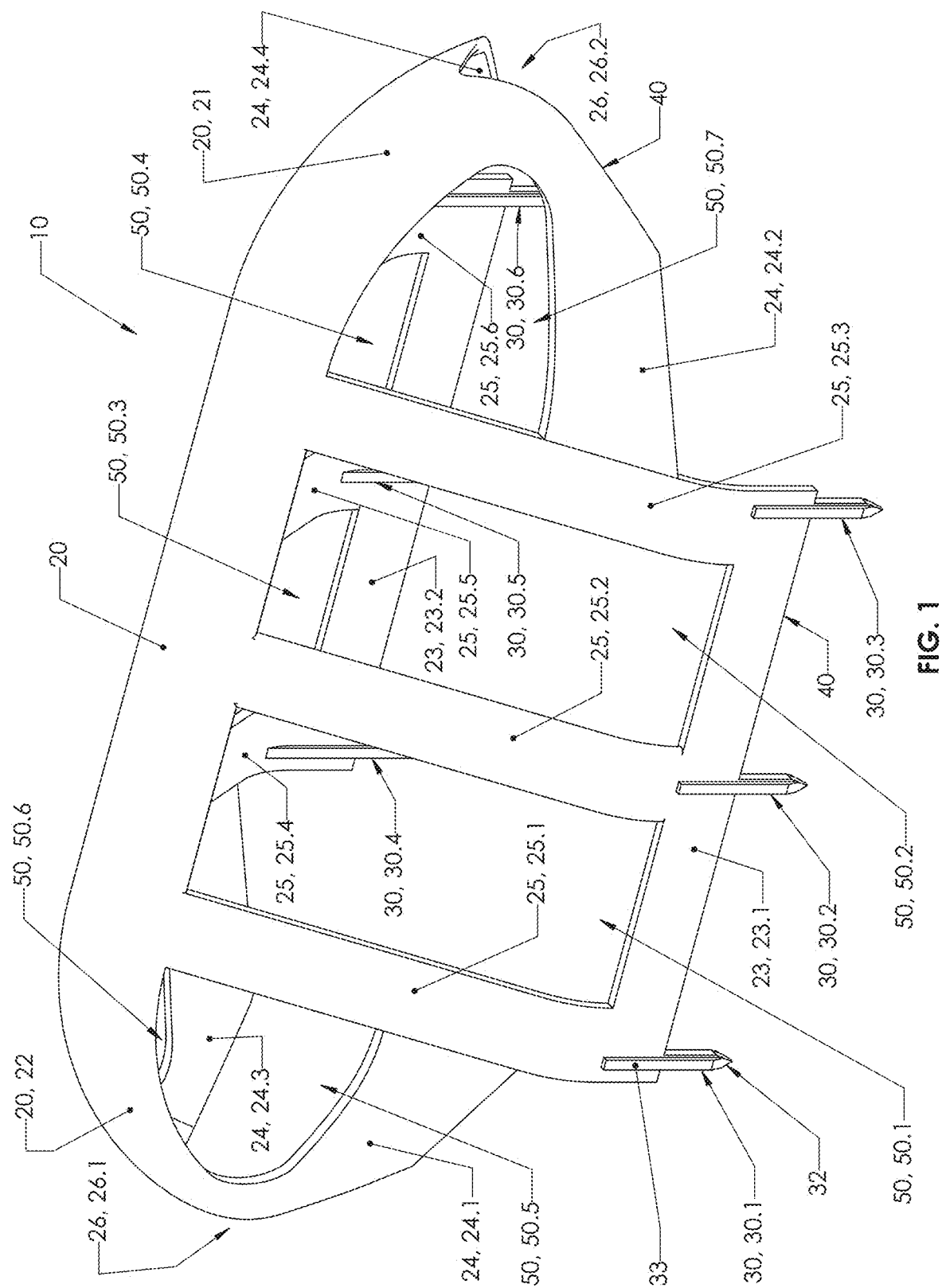
FIG. 1 is a perspective view of an exemplary embodiment of the hay bale spacer device, bale ventilation system, and methods of use thereof.
Figure 2:
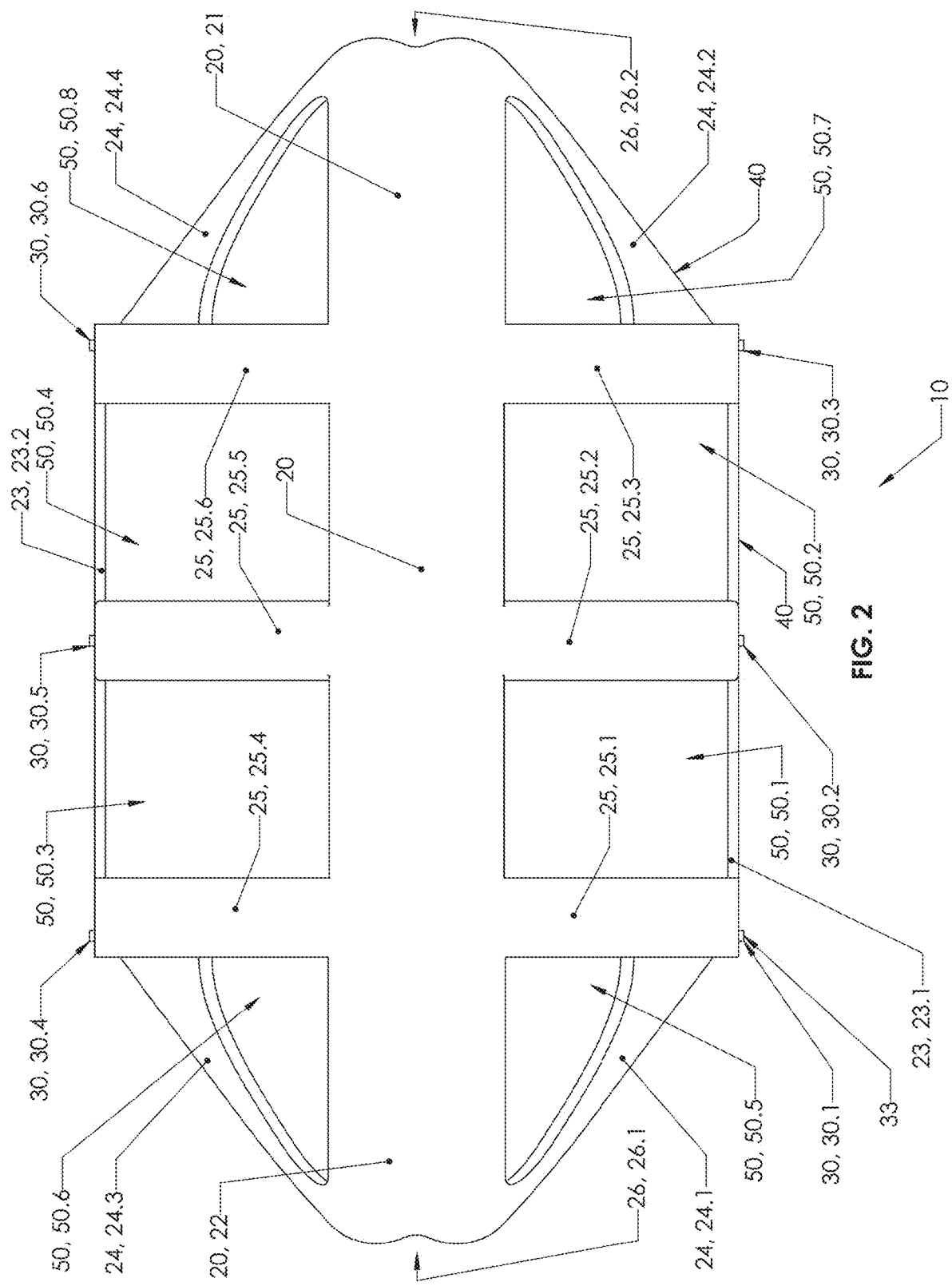
FIG. 2 is a top view the exemplary embodiment of FIG. 1.
Figure 3:
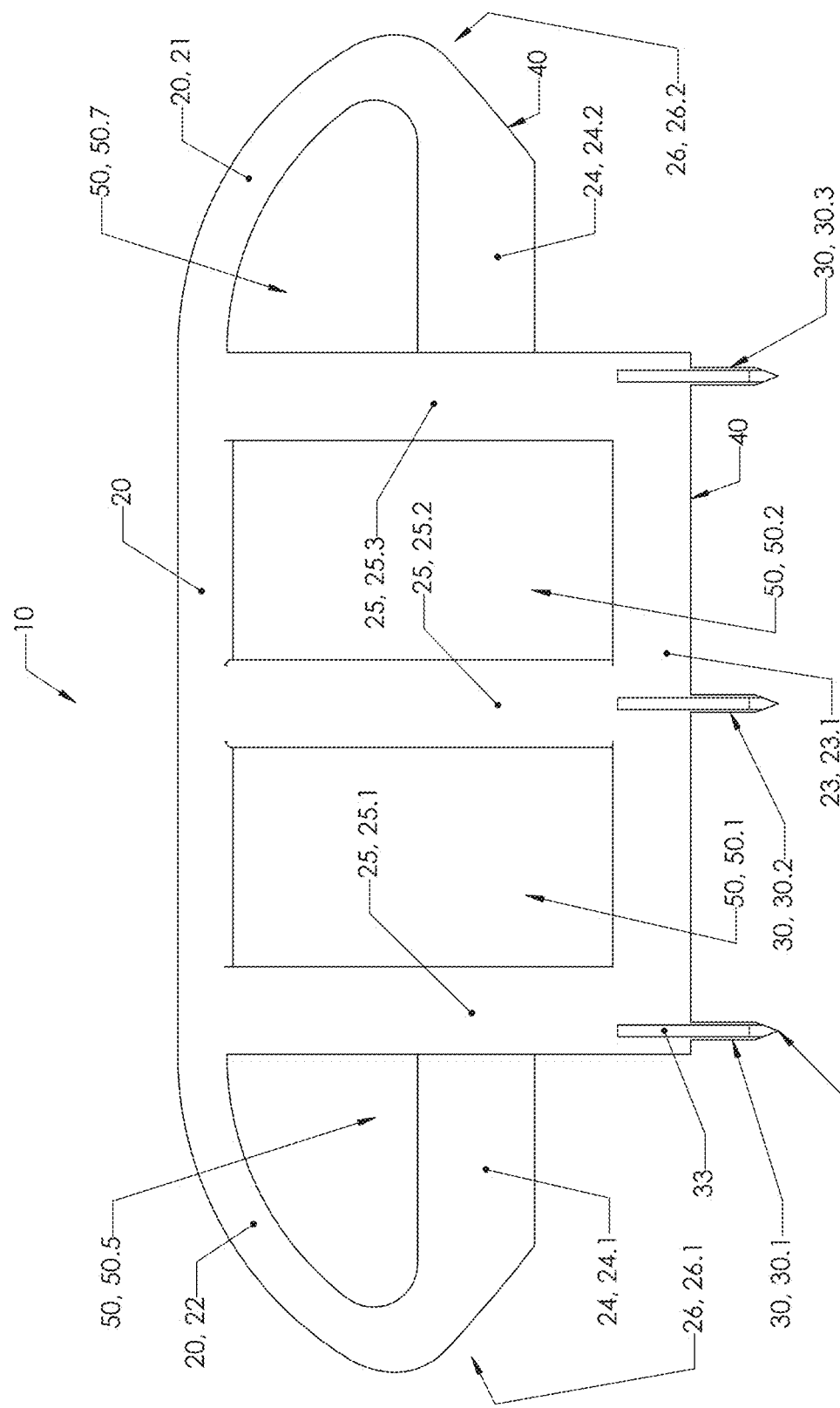
FIG. 3 is a side view of the exemplary embodiment of FIG. 1.
Figure 4:
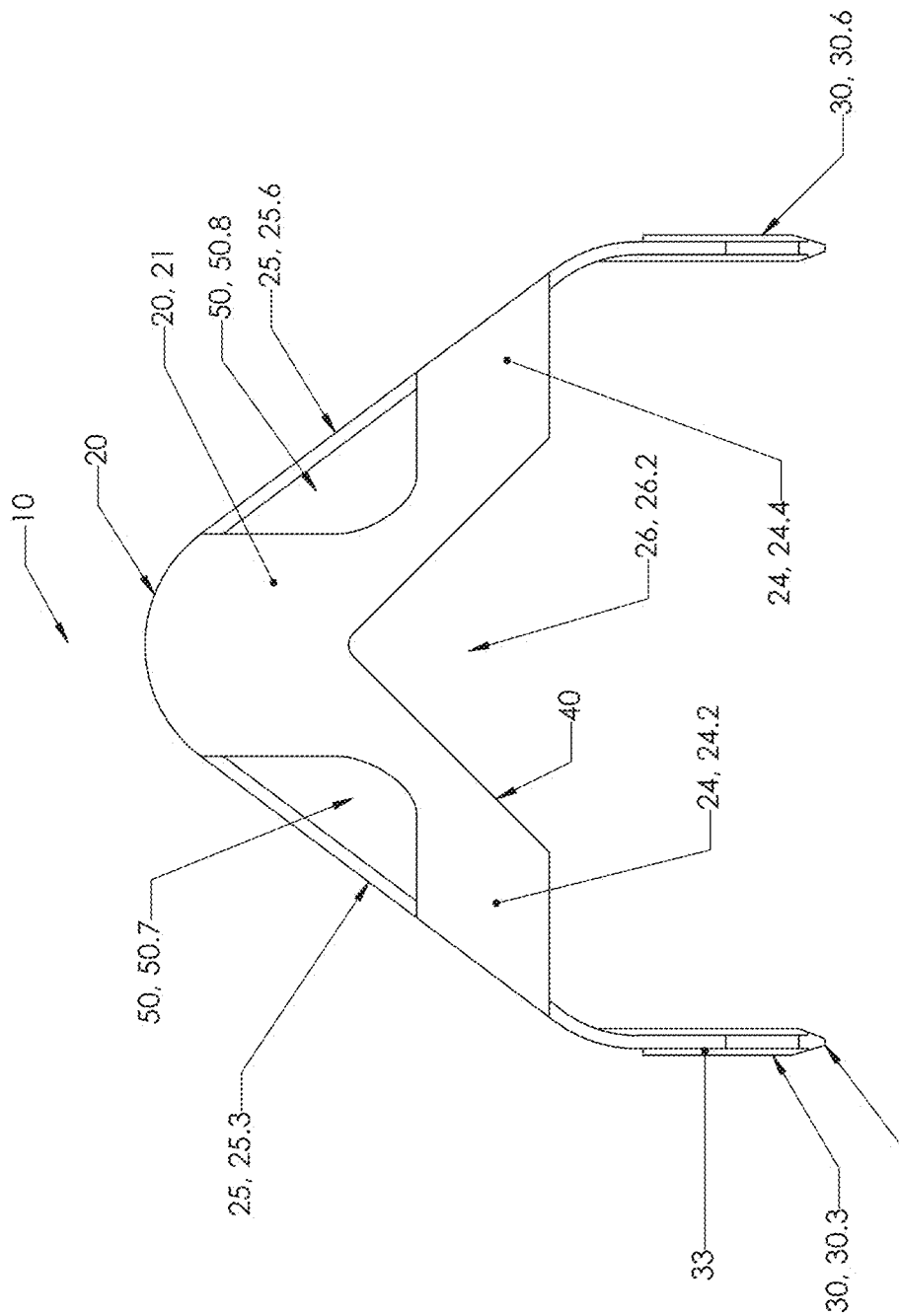
FIG. 4 is an end view of the exemplary embodiment of FIG. 1.
Figure 5:
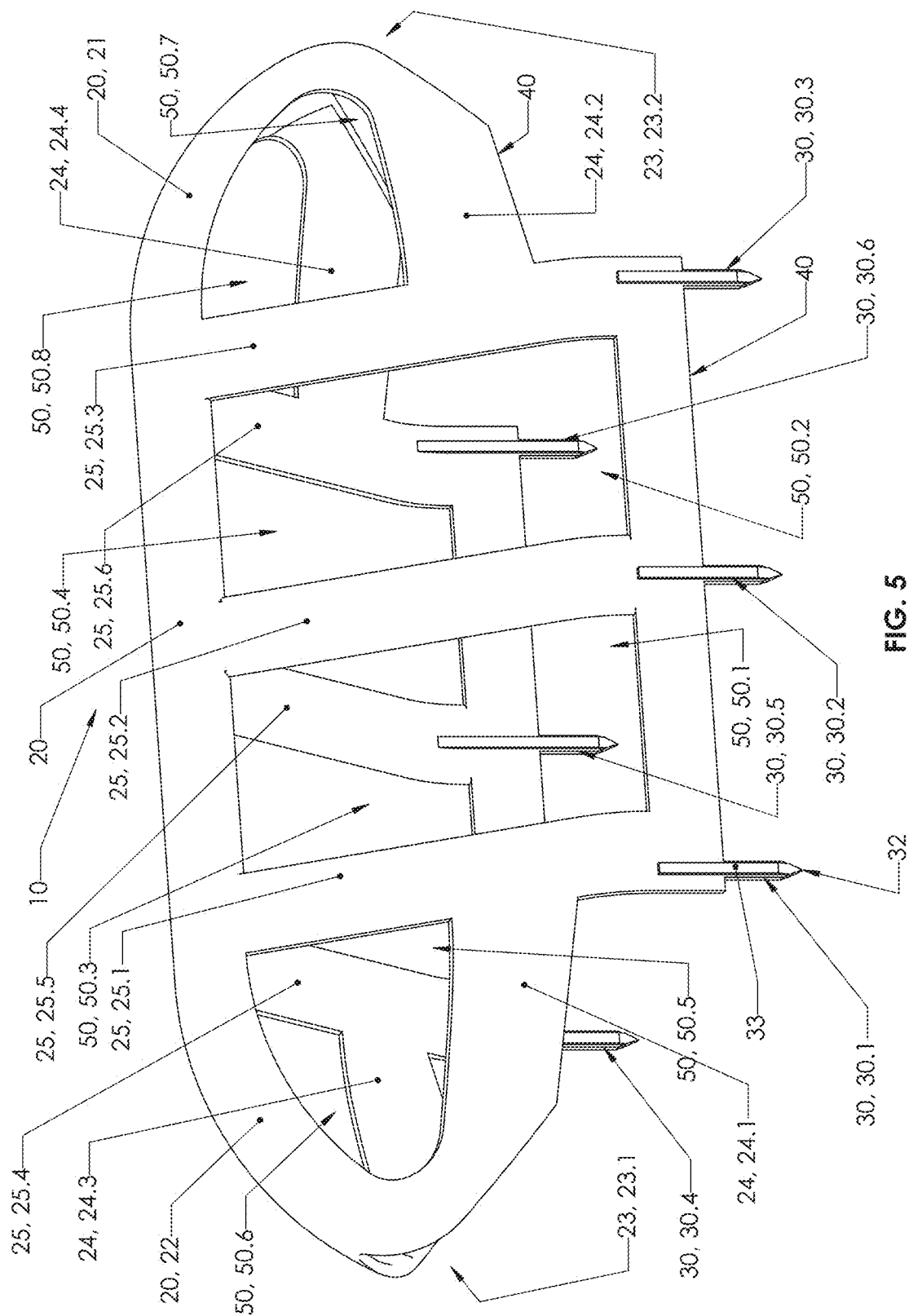
FIG. 5 is a second perspective view of the exemplary embodiment of FIG. 1.
Figure 6:
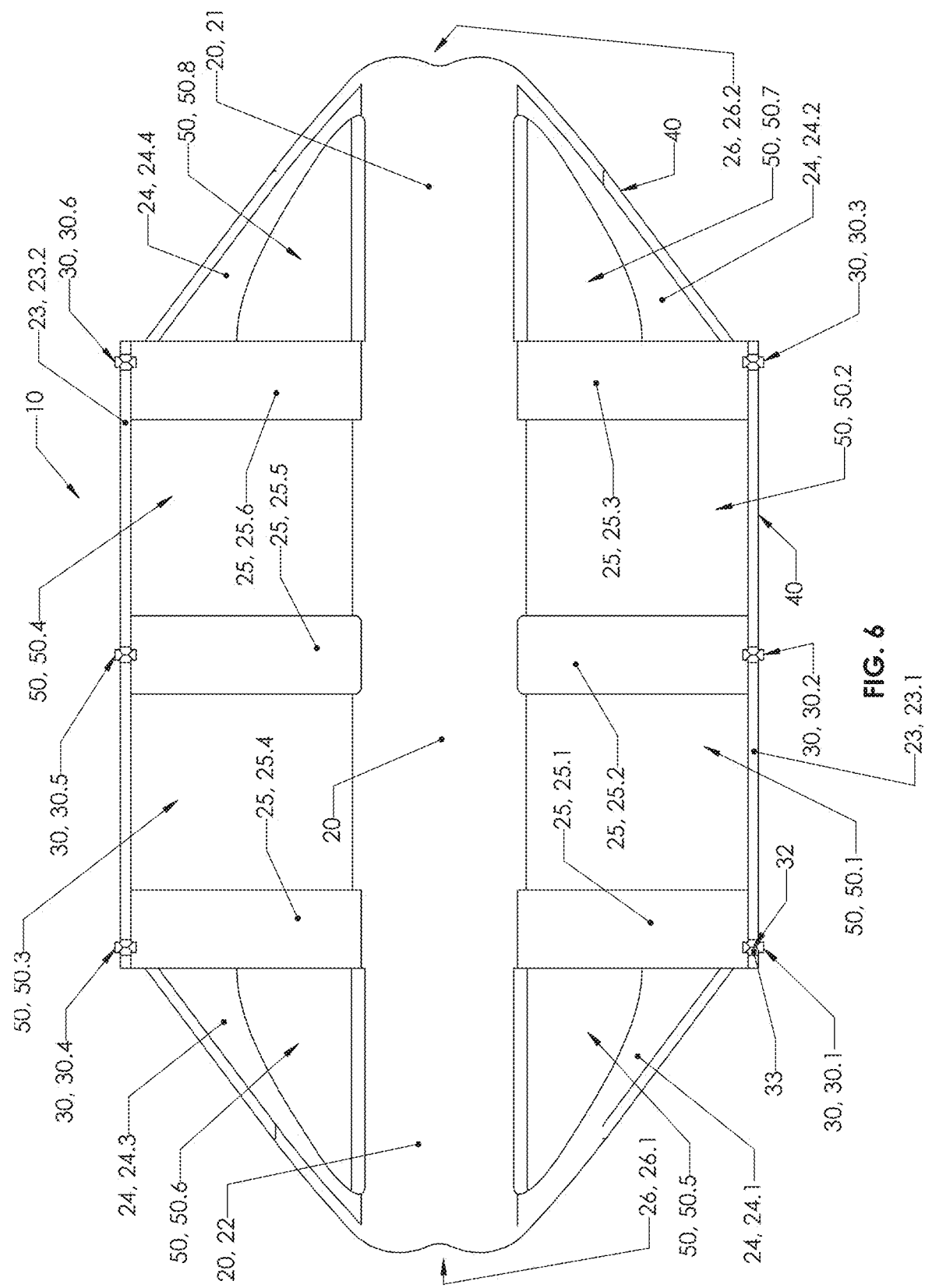
FIG. 6 is a bottom view of the exemplary embodiment of FIG. 1.
Figure 7:
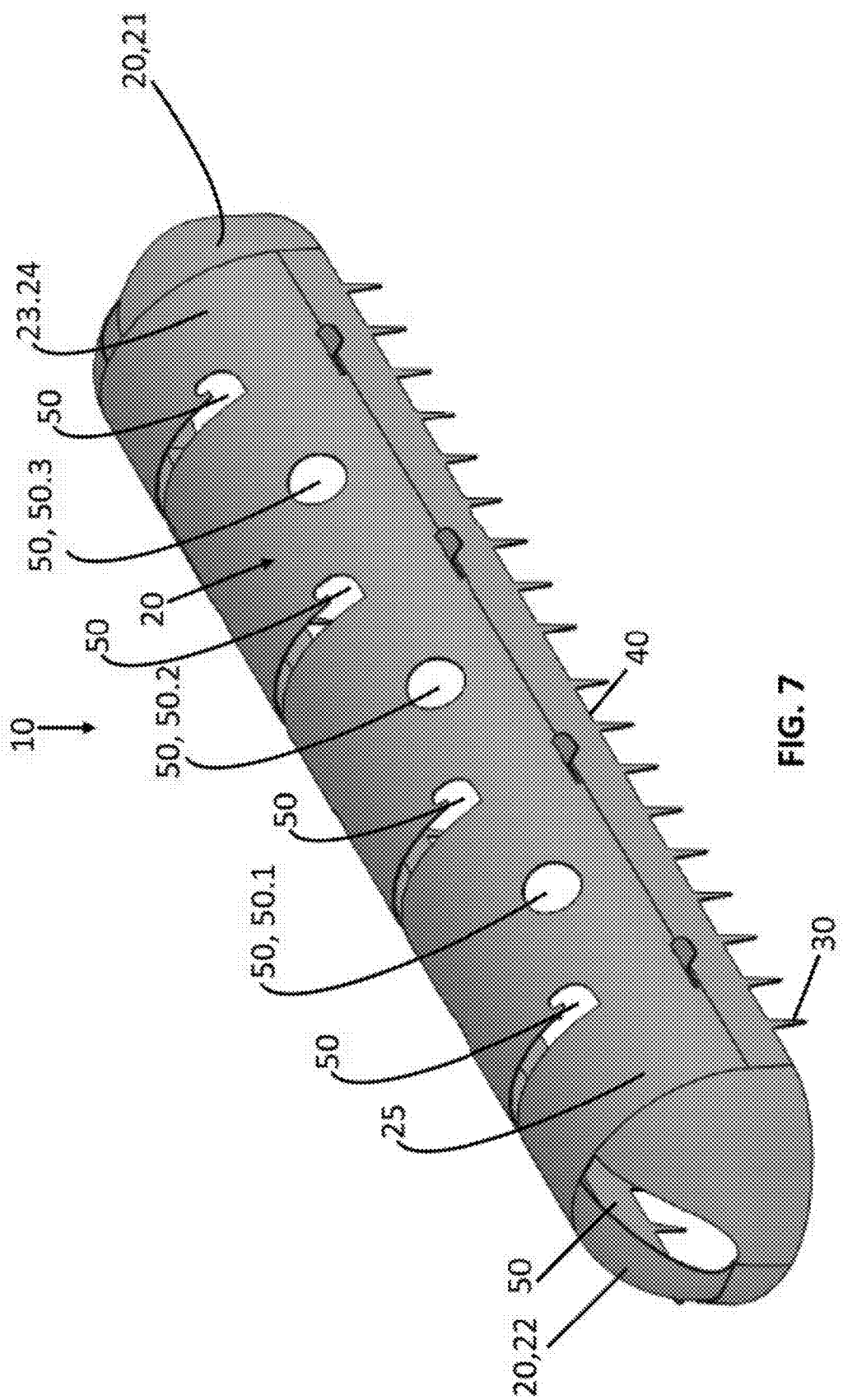
FIG. 7 is a perspective view of another exemplary embodiment of the hay bale spacer device, bale ventilation system, and methods of use thereof.
Figure 8:
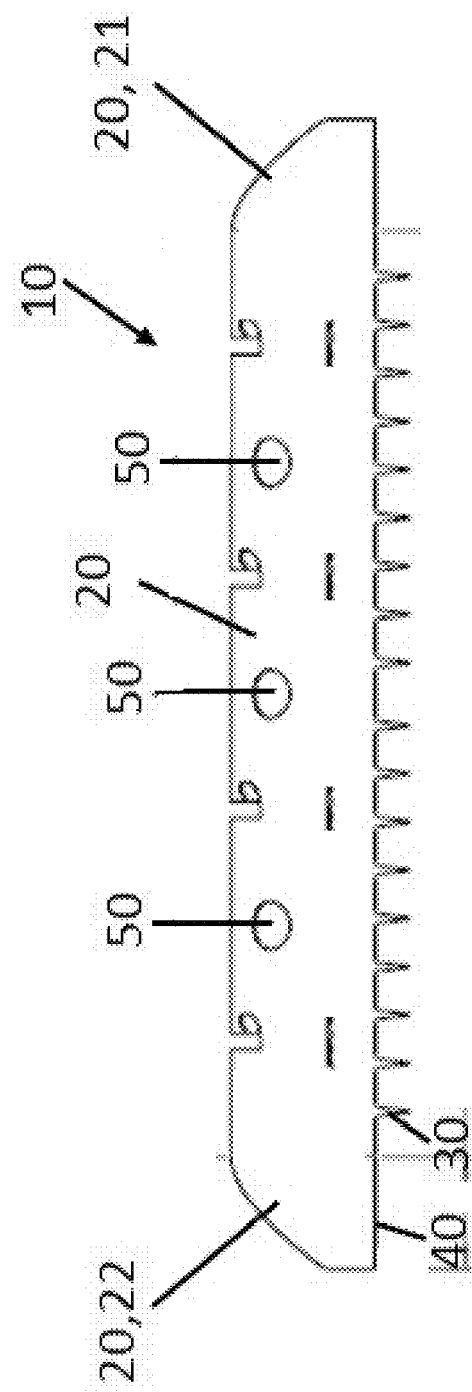
FIG. 8 is a side view of the exemplary embodiment of FIG. 7.

Referring now to FIGS. 7-8 by way of example, and not limitation, therein is illustrated another example embodiment hay bale spacer 10, wherein hay bale spacer 10 may include riser support 20 having edge 40 and/or side 23 wherein a plurality of splines, such as stakes 30 extend therefrom edge 40 and/or side 23. Preferably, plurality of stakes 30 may be utilized to stab, penetrate or latch hay bale spacer 10 thereto bale of hay BH, as shown in FIG. 9-10.

Moreover, riser support 20 may include first front end and second front end 22 preferably formed integral thereto riser support 20 and edge 40 and/or side 23. It is contemplated herein that first front end 21 and second front end 22 may provide elevation or height therebetween riser support 20 and edge 40 and/or side 23, and may be configured as straight, curved, angled or any other configuration or shape capable of connecting riser support 20 thereto edge 40. It is further contemplated herein that first front end 21 and second front end 22 may be configured or shaped similar to a bull nose shape having aperture 50.

Preferably, second or third side 25 may be positioned therebetween riser support 20 and edge 40 and/or side 23. Preferably, third side 25 may provide elevation or height therebetween riser support 20 and edge 40 and/or side 23, and may be configured as straight, curved, angled or any other configuration or shape capable of connecting riser support 20 thereto edge 40 and/or side 23. It is contemplated herein that third side 25 may be a continuous surface, formed of strips, or the like to provide one or more cut outs, holes or apertures 50 therein third side 25 of hay bale spacer 10. Furthermore, apertures 50, 50.1, 50.2 and 50.3 may be utilized to enable a user to firmly grip riser support 20 or finger insert therein apertures 50 and assist removal of hay bale spacer 10 therefrom bale of hay BH.

Referring again to FIGS. 7-8 hay bale spacer 10 may refer to a device that may be held in the hand and thrust into bale of hay BH and may have any desire dimensions, including, but not limited to, approximately 7.49 inches in height from edge 40 to the top of riser support 20 by 59.56 inches in length from first front end 21 to second front end 22 by 12.03 inches wide as inside distance between hay bale spacer 10. As an example, and clearly not limited thereto, the purpose of hay bale spacer 10 may be to grip by hand and thrust hay bale spacer 10 into bale of hay BH to create or maintain a spacer, such as air gap AG between an outer surface OS of bale of hay BH and tarp T, and that functions to create an environment with proper air circulation, prevent condensation, and to prevent mold growth within the hay bale, thus extending the storage expectancy of the bale.

Referring now to FIGS. 9-10 by way of example, and not limitation, therein is illustrated example embodiment hay bale spacer 10 shown in use, wherein a plurality of hay bale spacers 10 are removeably affixed to outer surface OS of bale of hay BH whether bale of hay BH is a round, square or rectangular bale or other bale configuration. Preferably hay bale spacer 10 may be gripped by hand about riser support 20 and removeably jabbed, inserted, or thrusted into outer surface OS of bale of hay BH wherein stakes 30 may be utilized to stab, penetrate or latch therein bale of hay BH to create or maintain a spacer or air gap AG between an outer surface OS of bale of hay BH and tarp T utilized to protect bales of hay BH from precipitation, and that functions to create an environment with proper air circulation, prevent condensation, and to prevent mold growth within the hay bale, thus extending the storage expectancy of the bale. Moreover, when bales of hay BH are stacked or otherwise packed close together and covered with tarp T to prevent precipitation from contacting bales of hay BH, tarp T creates an environment where condensation may form and collect under tarp T, and thus promote mold and mildew growth within t bales of hay BH, and shortening the storage expectancy of the bales of hay. It is contemplated herein that one or more hay bale spacer 10 may be positioned in series or end-to-end to create or maintain a spacer or air gap AG between an outer surface OS of bale of hay BH and tarp T.

Furthermore, any of one or more hay bale spacer 10 may be gripped by hand about riser support 20 and removed from bale of hay BH then relocated about outer surface OS of bale of hay BH and jabbed or thrusted into outer surface OS of bale of hay BH wherein stakes 30 may be utilized to stab, penetrate or latch therein bale of hay BH to create or maintain a spacer or air gap AG between an outer surface OS of bale of hay BH, and that functions to create an environment with improved air circulation under tarp T, to prevent condensation, and to prevent mold growth within the hay bale, thus extending the storage expectancy of the bale. Still furthermore, tarp T may be tied down to prevent flapping or blown off conditions by utilizing ropes stakes, bungee cords, rubber tie downs, rings, and the like to secure tarp T thereon bales of hay BH and to secure tarp T thereon bales of hay BH on either end of the bale stack, with tarp T fully covering the sides of the bale stack to protect the ends of the bale stack from precipitation.

It is contemplated herein that hay bale spacer 10 may be positioned or secured to the peak points of outer surface OS of bale of hay BH to create maximum air gap between outer surface OS of bale of hay BH and tarp T to create an environment with improved air circulation under tarp T.

Figure 11:
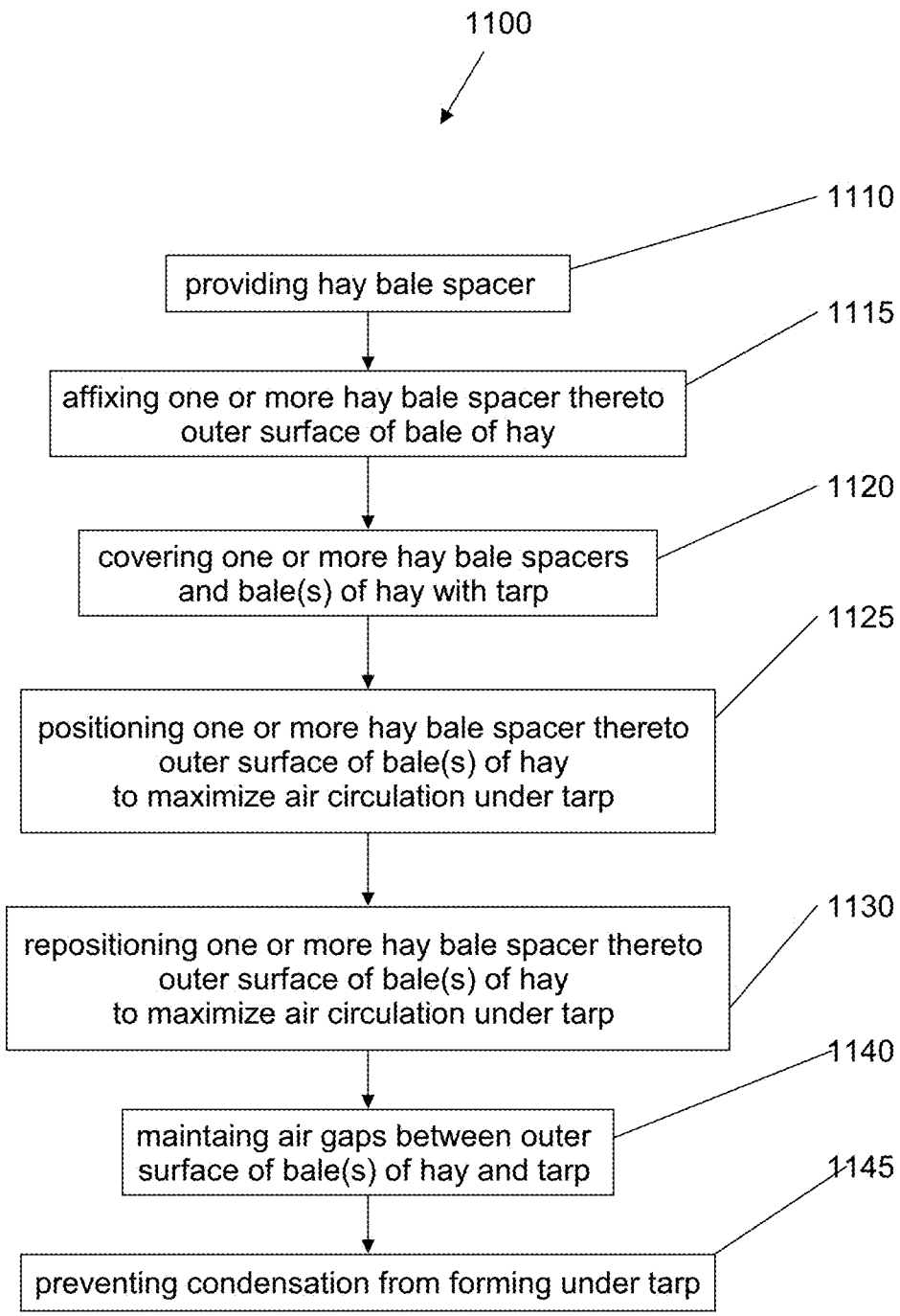
FIG. 11 is a flow diagram of a method of aerating a bale or stack of hay bales covered by a tarp.

Referring now to FIG. 11, there is illustrated a flow diagram 1100 of a method of utilizing hay bale spacer 10 to create an environment with proper air circulation, prevent condensation, and to prevent mold growth within the hay bale. In block or step 1110, providing hay bale spacer 10 having riser support 20 with edge 40 wherein a plurality of splines, such as stakes 30 extend therefrom edge 40 and with any of the various embodiments or elements shown and/or described herein, as described above in FIGS. 1-10. In block or step 1115, affixing (removeably) one or more hay bale spacer 10 thereto outer surface OS of bale(s) of hay BH. In block or step 1120, covering one or more hay bale spacers 10 and bale(s) of hay BH with tarp T. In block or step 1125, positioning one or more hay bale spacer 10 thereto outer surface OS of bale(s) of hay BH to maximize air circulation under tarp T. In block or step 1130, maintaining air gaps AG between outer surface OS of bale(s) of hay BH and tarp T. In block or step 1135, preventing condensation from forming under tarp T by circulating air under tarp T to evaporate condensation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. An apparatus for maintaining a gap between an outer curved surface of a bale of hay and a tarp positioned thereon, said apparatus comprising:
    a fixed elongated spacer, said spacer having a first planar side and a second planar side configured with a riser support formed integral therebetween, each said first planar side and said second planar side formed of three or more vertical flat strips spaced thereapart having two or more apertures formed therein, said strips positioned between said riser support and a bottom edge of said first planar side and a bottom edge of said second planar side, said riser support having a first rounded end and a second rounded end, said rounded ends configured to protrude forward of said first planar side and said second planar side and be elevated above said bottom edges, each of said rounded ends formed from a first curved front end and a second curved front end configured to protrude forward from said riser and extend back to said first and second planar sides respectively, each of said bottom edges angled inward relative to said planar side; and a plurality of stakes extending from said bottom edges, said plurality of stakes configured to releasably penetrate through the outer surface of the bale of hay.

2. The apparatus of claim 1, wherein said first rounded end and said second rounded end further comprise an indent therein.

3. The apparatus of claim 1, wherein said bottom edge of said first planar side comprises a first plurality of stakes and said bottom edge of said second planar side comprises a second plurality of stakes extending therefrom.

4. The apparatus of claim 1, wherein said two or more apertures enables a user to grip said riser support.

5. The apparatus of claim 4, wherein said two or more apertures provides an air flow passageway within said spacer.

6. A system for maintaining a gap for ventilation, said system comprising:

a plurality of bales of hay, said plurality of bales of hay having an outer curved surface;

a tarp to cover said plurality of bales of hay;

a plurality of fixed elongated spacers, each of said spacers having a first planar side and a second planar side configured with a riser support formed integral therebetween, each said first planar side and a bottom edge of said second planar side formed of three or more vertical flat strips spaced thereapart having two or more apertures formed therein, said strips positioned between said riser support and a bottom edge of said first planar side and said second planar side, said riser support having a first rounded end and a second rounded end, said rounded ends configured to protrude forward of said first planar side and said second planar side and be elevated above said bottom edges, each of said rounded ends formed from a first curved front end and a second curved front end configured to protrude forward from said riser and extend back to said first and second planar sides respectively, each of said bottom edges angled inward relative to said planar side; and a plurality of stakes extending from said bottom edges, said plurality of stakes configured to releasably penetrate through the outer surface of the plurality of bales of hay;

wherein said spacers are positioned between the outer surface and the tarp.

7. The system of claim 6, whereby said two or more apertures enables a user to grip said riser support.

8. The system of claim 7, wherein said two or more apertures provides an air flow passageway within said spacer.

9. A method of maintaining an gap between an outer curved surface of a plurality of bales of hay and a tarp to prevent condensation from forming, comprising the steps of:

providing a fixed plurality of elongated spacers, each of said spacers having a first planar side and a second planar side configured with a riser support formed integral therebetween, each said first planar side and said second planar side formed of three or more vertical flat strips spaced thereapart having two or more apertures formed therein, said strips positioned between said riser support and a bottom edge of said first planar side and a bottom edge of said second planar side, said riser support having a first rounded end and a second rounded end, said rounded ends configured to protrude forward of said first planar side and said second planar side and be elevated above said bottom edges, each of said rounded ends formed from a first curved front end and a second curved front end configured to protrude forward from said riser and extend back to said first and second planar sides respectively, each of said bottom edges angled inward relative to said planar side, a plurality of stakes extending from said bottom edges;

affixing said plurality of elongated spacers to the outer surface of the plurality of bales of hay; and covering said plurality of bales of hay and said plurality of elongated spacers with said tarp.

10. The method of claim 9, further comprising the step of preventing condensation from forming under said tarp.

* * * * *